United States Patent
Ahn et al.

(10) Patent No.: US 11,201,830 B2
(45) Date of Patent: Dec. 14, 2021

(54) WIRELESS COMMUNICATION METHOD FOR MULTI-USER TRANSMISSION SCHEDULING, AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/908,320

(22) Filed: Jun. 22, 2020

(65) Prior Publication Data
US 2020/0322278 A1    Oct. 8, 2020

Related U.S. Application Data

(63) Continuation of application No. 15/736,968, filed as application No. PCT/KR2016/006415 on Jun. 16, 2016, now Pat. No. 10,721,175.

(30) Foreign Application Priority Data

Jun. 16, 2015 (KR) .................. 10-2015-0085451
Jun. 29, 2015 (KR) .................. 10-2015-0092534
May 13, 2016 (KR) .................. 10-2016-0059090

(51) Int. Cl.
H04L 12/873    (2013.01)
H04L 1/16      (2006.01)
(Continued)

(52) U.S. Cl.
CPC ............ H04L 47/52 (2013.01); H04L 1/1607 (2013.01); H04L 1/18 (2013.01); H04L 47/58 (2013.01);
(Continued)

(58) Field of Classification Search
None
See application file for complete search history.

(56) References Cited

U.S. PATENT DOCUMENTS 9,912,388 B2    3/2018    Chu et al.
2009/0225682 A1  9/2009    Grote-Lopez et al.
(Continued)

FOREIGN PATENT DOCUMENTS

KR    10-0882133       2/2009
KR    10-2010-0067894  6/2010
(Continued)

OTHER PUBLICATIONS

Office Action dated Feb. 5, 2021 for Korean Patent Application No. 10-2017-7036316 and its English translation provided by the applicant's foreign counsel.
(Continued)

*Primary Examiner* — Kenny S Lin
(74) *Attorney, Agent, or Firm* — Ladas & Parry, LLP

(57) ABSTRACT

The present invention relates to a wireless communication terminal and a wireless communication method for efficiently scheduling uplink multi-user transmission.
To this end, provided are a base wireless communication terminal, including: a transceiver configured to transmit and receive a wireless signal; and a processor configured to
(Continued)

control an operation of the transceiver, wherein the processor selects an access category for transmitting a trigger frame which solicits an uplink multi-user transmission, performs a backoff procedure for transmitting the trigger frame based on the selected access category, and transmits the trigger frame when a backoff counter of the backoff procedure expires and a wireless communication method using the same.

20 Claims, 26 Drawing Sheets

(51) Int. Cl.
    *H04L 12/869*     (2013.01)
    *H04L 1/18*     (2006.01)
    *H04L 12/865*     (2013.01)
    *H04W 74/00*     (2009.01)
    *H04W 74/08*     (2009.01)
    *H04W 84/12*     (2009.01)

(52) U.S. Cl.
    CPC ....... *H04L 47/6275* (2013.01); *H04W 74/002* (2013.01); *H04W 74/085* (2013.01); *H04W 84/12* (2013.01)

(56) References Cited

U.S. PATENT DOCUMENTS

| | | |
|---|---|---|
| 2013/0121151 A1 | 5/2013 | Nguyen et al. |
| 2013/0229996 A1 | 9/2013 | Wang et al. |
| 2015/0049727 A1 | 2/2015 | Wentink et al. |
| 2015/0063111 A1 | 3/2015 | Merlin et al. |
| 2017/0127298 A1* | 5/2017 | Ryu ................... H04W 28/0278 |
| 2017/0127440 A1* | 5/2017 | Chun ................. H04W 72/1284 |
| 2017/0171878 A1* | 6/2017 | Chun .................. H04B 7/0404 |
| 2017/0325266 A1* | 11/2017 | Kim .................. H04W 74/0833 |
| 2018/0192444 A1 | 7/2018 | Park et al. |
| 2018/0254993 A1 | 9/2018 | Anh et al. |
| 2020/0322279 A1 | 10/2020 | Ahn et al. |

FOREIGN PATENT DOCUMENTS

| | | |
|---|---|---|
| KR | 10-2010-0119086 | 11/2010 |
| KR | 10-2012-0139788 | 12/2012 |
| KR | 10-2013-0015012 | 2/2013 |
| KR | 10-2014-0113599 | 9/2014 |

OTHER PUBLICATIONS

International Search Report for PCT/KR2016/006415 dated Oct. 4, 2016 and its English translation from WIPO.
Written Opinion of the International Searching Authority for PCT/KR2016/006415 dated Oct. 4, 2016 and its English translation from WIPO.
International Preliminary Report on Patentability (Chapter I) for PCT/KR2016/006415 dated Dec. 19, 2017 and its English translation from WIPO.
Notice of Allowance dated Mar. 13, 2020 for U.S. Appl. No. 15/736,968 (now published as US 2018/0254993).
Non-Final Office Action dated Nov. 25, 2019 for U.S. Appl. No. 15/736,968 (now published as US 2018/0254993).
Notice of Allowance dated Sep. 14, 2021 for U.S. Appl. No. 16/908,335.

* cited by examiner

WIRELESS COMMUNICATION METHOD FOR MULTI-USER TRANSMISSION SCHEDULING, AND WIRELESS COMMUNICATION TERMINAL USING SAME

CROSS-REFERENCE TO RELATED APPLICATIONS

This application is a continuation of U.S. patent application Ser. No. 15/736,968 filed on May 9, 2018, which is the U.S. National Stage of International Patent Application No. PCT/KR2016/006415 filed on Jun. 16, 2016, which claims the priority to Korean Patent Application No. 10-2015-0085451 filed in the Korean Intellectual Property Office on Jun. 16, 2015, Korean Patent Application No. 10-2015-0092534 filed in the Korean Intellectual Property Office on Jun. 29, 2015 and Korean Patent Application No. 10-2016-0059090 filed in the Korean Intellectual Property Office on May 13, 2016, the entire contents of which are incorporated herein by reference.

TECHNICAL FIELD

The present invention relates to a wireless communication method for multi-user transmission scheduling and a wireless communication terminal using the same, and more particularly, to a wireless communication method and a wireless communication terminal for efficiently scheduling simultaneous transmission of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to perform efficient scheduling of an uplink/downlink multi-user transmission.

In addition, the present invention has an object to provide an efficient scheduling method for channel access of each terminal in a situation where a multi-user transmission and a single-user transmission are mixed.

Technical Solution

In order to achieve the objects, the present invention provides a wireless communication method and a wireless communication terminal as below.

First, an exemplary embodiment of the present invention provides a base wireless communication terminal comprising a processor and a transceiver, wherein the processor selects an access category for transmitting a trigger frame which solicits an uplink multi-user transmission, performs a backoff procedure for transmitting the trigger frame based on the selected access category, and transmits the trigger frame when a backoff counter of the backoff procedure expires.

The processor may determines a size of a contention window for the backoff procedure using parameters of the selected access category, obtain a backoff counter within the determined contention window, and perform the backoff procedure using the obtained backoff counter.

The parameter may include a minimum contention window value and a maximum contention window value, and a size of a contention window for the backoff procedure may be determined between a minimum contention window value and a maximum contention window value of the selected access category.

The access category for transmitting the trigger frame may have a higher priority than access categories of data to be transmitted to another terminal.

The processor may determine that the uplink multi-user transmission is successful and transmits a block ACK when uplink data is received from at least one terminal indicated by the trigger frame.

The processor may determine that the uplink multi-user transmission has failed and retransmit the trigger frame when no uplink data corresponding to the trigger frame has received.

The processor may increase a size of a contention window based on the access category for transmitting the trigger frame, obtain a new backoff counter within an increased contention window, and perform a backoff procedure for retransmitting the trigger frame using the new backoff counter.

The base wireless communication terminal may receive a buffer status report of at least one terminal through the transceiver, and perform a backoff procedure for transmitting the trigger frame when received buffer status report information is a predetermined amount or more.

The processor may generate a virtual queue for transmitting the trigger frame using the received buffer status report, and determine whether to transmit the trigger frame based on internal contention between an access category queue for a downlink single-user transmission of the base wireless communication terminal and the virtual queue.

The processor may assign backoff counters respectively corresponding to the access category queue and the virtual queue, the backoff counters being respectively assigned based on parameters of an access category set in a corresponding queue, and transmit the trigger frame when a backoff counter corresponding to the virtual queue expires.

In addition, an exemplary embodiment of the present invention provides a wireless communication method of a base wireless communication terminal, the method including: selecting an access category for transmitting a trigger frame which solicits an uplink multi-user transmission; performing a backoff procedure for transmitting the trigger frame based on the selected access category; and transmitting the trigger frame when a backoff counter of the backoff procedure expires.

Advantageous Effects

According to an embodiment of the present invention, efficient uplink multi-user transmission scheduling is possible in a contention-based channel access system.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0085451, 10-2015-0092534 and 10-2016-0059090 filed in the Korean Intellectual Property Office and the embodiments and mentioned items described in the respective application, which forms the basis of the priority, shall be included in the Detailed Description of the present application.

Figure 1:
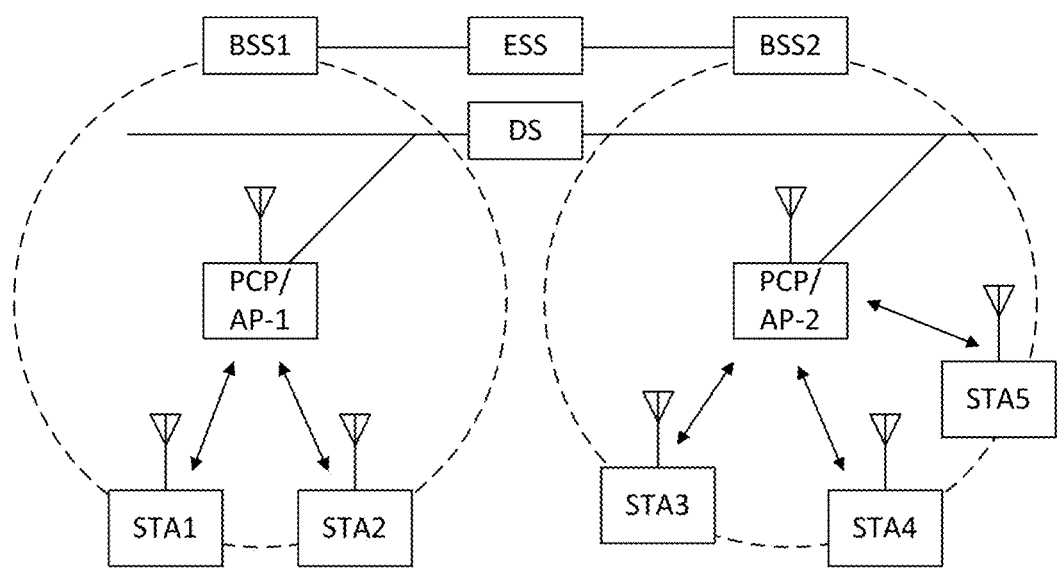
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
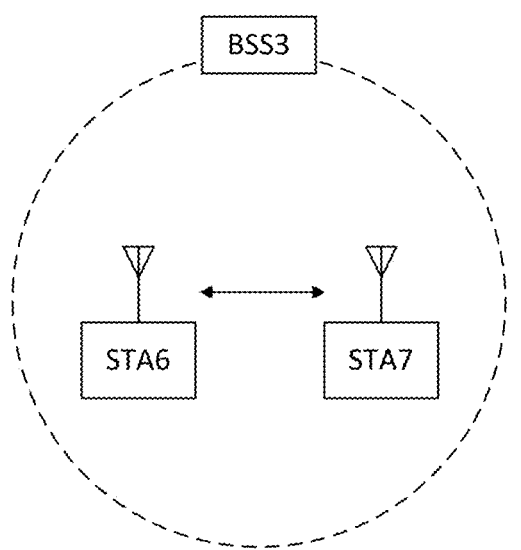
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
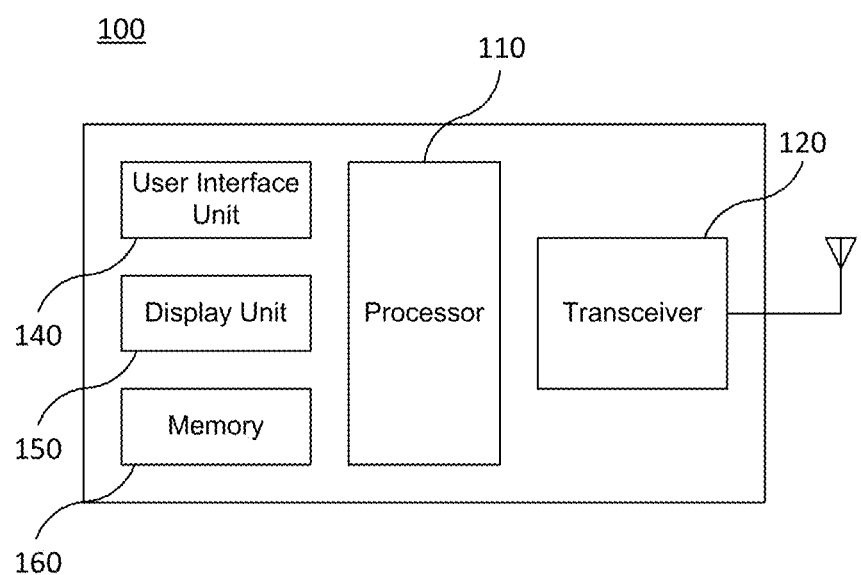
FIG. 3 illustrates a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip. In an embodiment of the present invention, the transceiver 120 may represent a radio frequency (RF) transceiver module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. That is, the processor 110 may be a modem or a modulator/demodulator for modulating and demodulating wireless signals transmitted to and received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
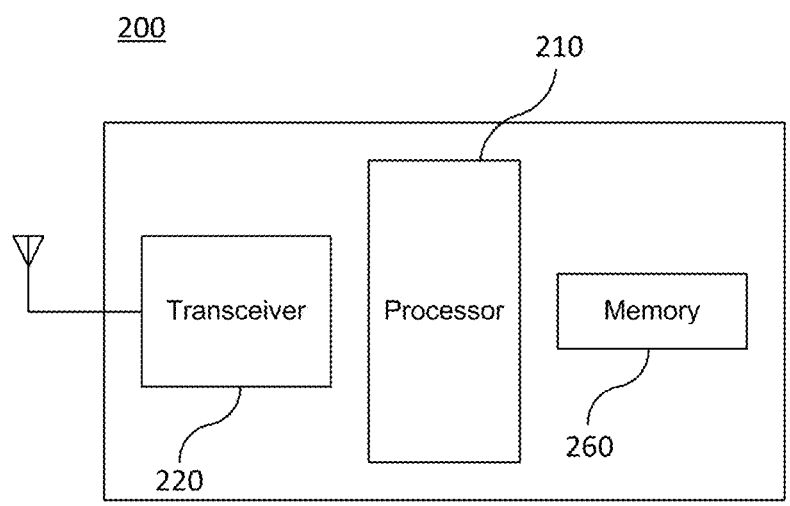
FIG. 4 illustrates a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200. In an embodiment of the present invention, the transceiver 220 may represent a radio frequency (RF) transceiver module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the transceiver 220. The processor 210 controls various operations such as wireless signal transmission/reception of the AP 200 according to the embodiment of the present invention. A detailed embodiment thereof will be described below.

Figure 5:
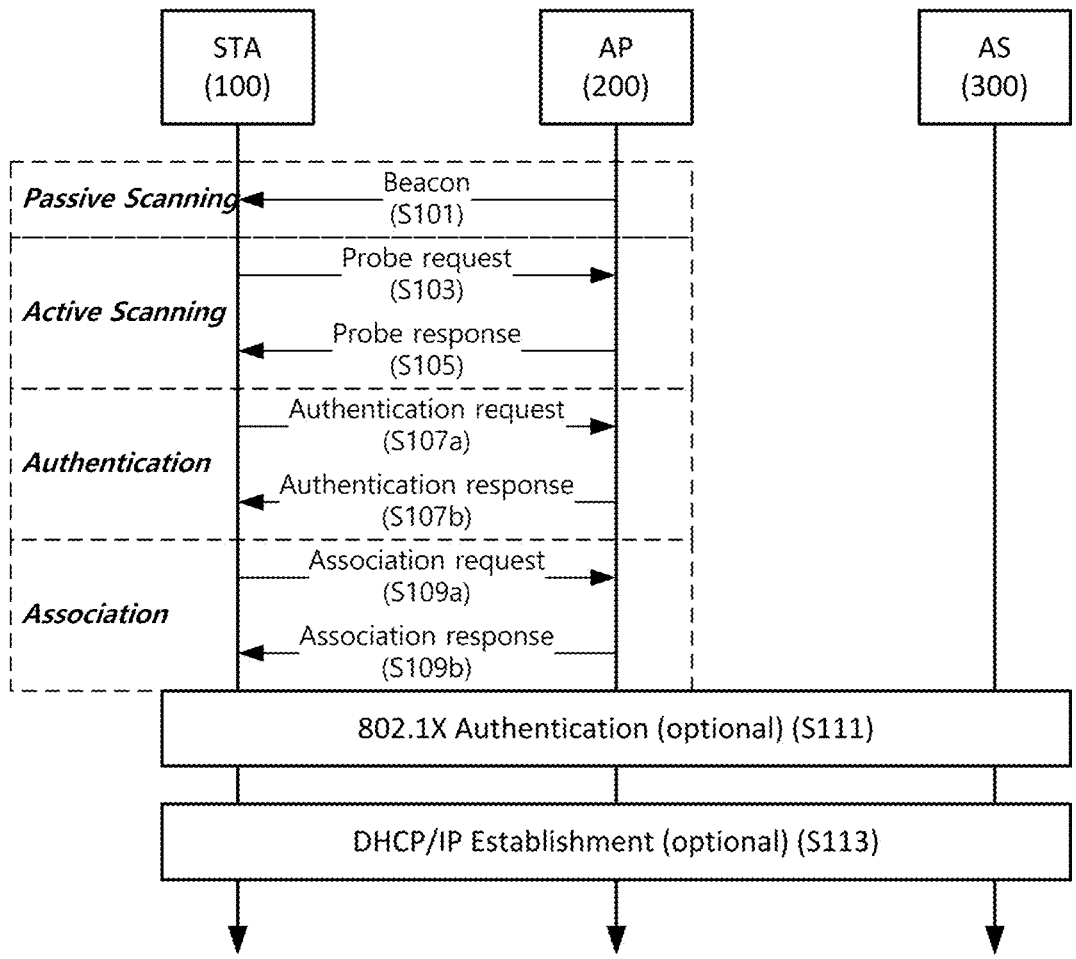
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
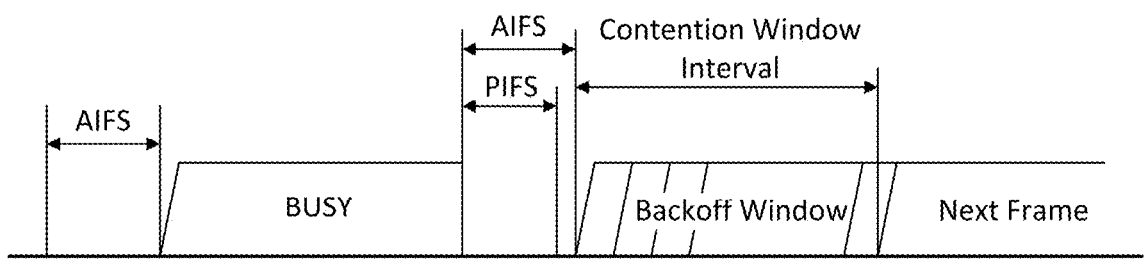
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
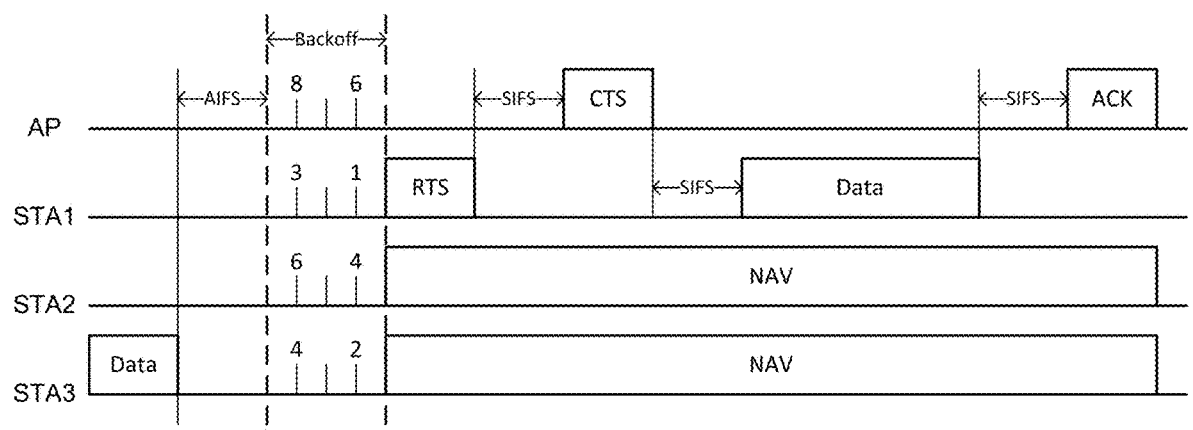
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number assigned to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being assigned with a new random number. In this case, the newly assigned random number may be determined within a range (2*CW) twice larger than a previous predetermined random number range (a contention window, CW).

Uplink Multi-User Transmission

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

In order to perform the UL-MU transmission, the channel to be used and the transmission start time of each STA that performs uplink transmission should be adjusted. In order to efficiently schedule the UL-MU transmission, state information of each STA needs to be transmitted to the AP. According to an embodiment of the present invention, information for scheduling of a UL-MU transmission may be indicated through a predetermined field of a preamble of a packet and/or a predetermined field of a MAC header. For example, a STA may indicate information for UL-MU transmission scheduling through a predetermined field of a preamble or a MAC header of an uplink transmission packet, and may transmit the information to an AP. In this case, the information for UL-MU transmission scheduling includes at least one of buffer status information of each STA, channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the UL-MU transmission process may be managed by the AP. The UL-MU transmission may be performed in response to a trigger frame transmitted by the AP. The STAs simultaneously transmit uplink data a predetermined IFS time after receiving the trigger frame. The trigger frame indicates the data transmission time point of the uplink STAs and may inform the channel (or subchannel) information allocated to the uplink STAs. When the AP transmits the trigger frame, a plurality of STAs transmit uplink data through the respective allocated subcarriers at a time point designated by the trigger frame. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, a UL-MU transmission may be performed based on a contention of a plurality of STAs for a particular resource unit. For example, if an AID field value for a particular resource unit is set to a specific value (e.g., 0) that is not assigned to STAs, a plurality of STAs may attempt random access (RA) for the corresponding resource unit.

Figure 8:
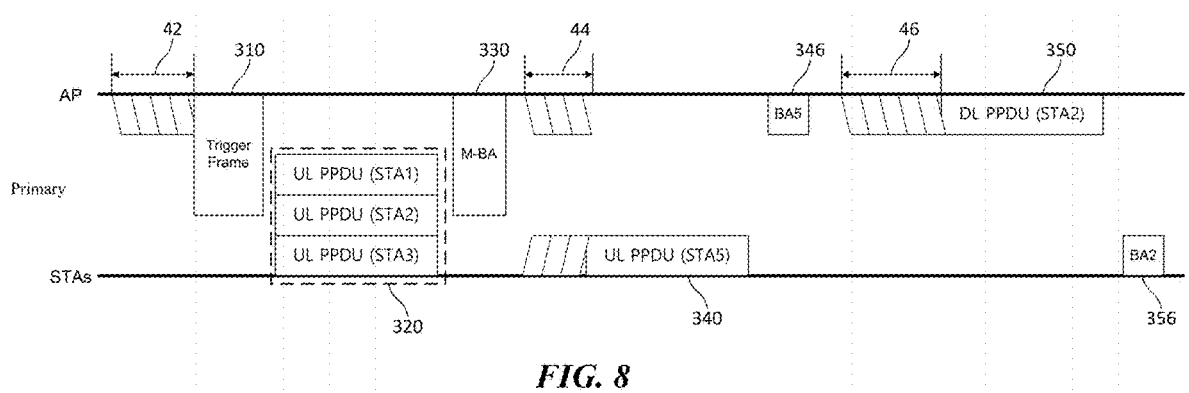
FIGS. 8 and 9 illustrate an embodiment of an uplink multi-user transmission process of a non-legacy wireless LAN system.
Figure 9:
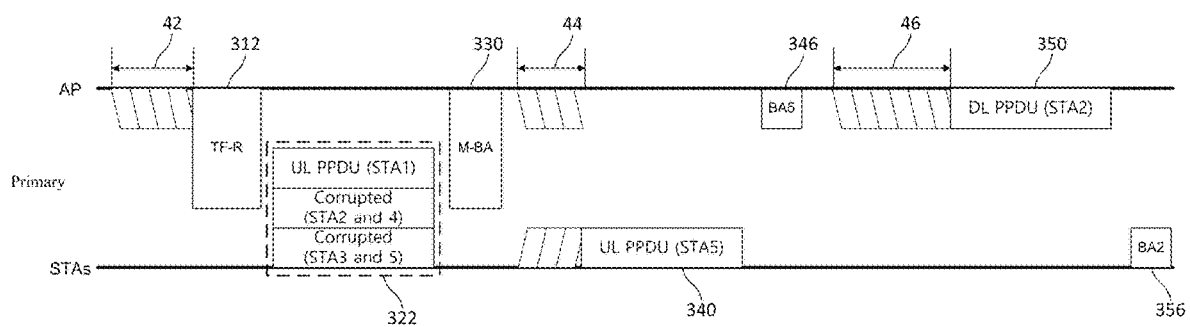

FIGS. 8 and 9 illustrate an embodiment of an uplink multi-user transmission process of a non-legacy wireless LAN system.

First, referring to FIG. 8, an AP transmits a trigger frame 310 for initiating a UL-MU transmission process. The AP may perform a separate backoff procedure for transmitting the trigger frame 310. When the backoff procedure for transmitting the trigger frame 310 expires in the contention window interval 42, the AP transmits the trigger frame 310. STAs receive the trigger frame 310 transmitted by the AP and transmit uplink multi-user data 320, that is, the uplink multi-user PLCP protocol data unit (UL MU PPPU) in response thereto. The uplink multi-user data 320 may be transmitted in a form including at least one of OFDMA and MU-MIMO. When the transmission of the uplink multi-user data 320 is successful, the AP transmits an M-BA 330 in response thereto. The M-BA 330 includes ACK information for STAs that have succeeded in transmitting the uplink multi-user data 320. In the embodiment of FIG. 8, STA1, STA2, and STA3 succeed in uplink data transmission in response to the trigger frame 310, and the AP transmits ACK information for STA1, STA2, and STA3 via the M-BA 330.

After the UL-MU transmission process is completed, the AP obtains a new backoff counter for contention in the next contention window intervals 44 and 46. In this case, the AP obtains a backoff counter within a contention window determined based on an access category of the next data to be transmitted. The AP contends with STAs based on the new backoff counter and accesses the channel. In the embodiment of FIG. 8, STA5 has won the contention in the next contention window interval 44 of the UL-MU transmission process. Accordingly, the STA5 transmits uplink data 340 to the AP, and the AP transmits an ACK 346 in response thereto. Also, in the next contention window interval 46, the AP has won the contention. Accordingly, the AP transmits downlink data 350 to the STA2, and the STA2 transmits an ACK 356 in response thereto.

FIG. 9 illustrates an embodiment in which a transmission of some uplink data has failed in the UL-MU transmission process. In the embodiment of FIG. 9, duplicated descriptions of parts which are the same or corresponding to those of the embodiment of FIG. 8 will be omitted.

Referring to FIG. 9, the AP transmits a TF-R 312. In an embodiment of the present invention, the TF-R 312 represents a random access based trigger frame. That is, the TF-R 312 triggers an uplink multi-user data transmission by allocating some or all of the resources for random access.

The AP may set an AID field value for a specific resource unit to a predetermined value (for example, 0), to allocate the corresponding resource unit for random access. When a backoff procedure for transmitting the TF-R 312 expires in the contention window interval 42, the AP transmits the TF-R 312. The STAs receive the TF-R 312 transmitted by the AP and transmit uplink multi-user data 322 in response thereto.

In this case, the uplink multi-user data 322 transmitted by the STAs may include random access uplink data. The STAs participating in the random access UL-MU transmission transmit uplink data through a resource unit allocated for random access by the TF-R 312. Since the resource unit allocated for random access is not assigned to a specific STA, a plurality of STAs may transmit uplink data at the same time and a collision may occur. In the example of FIG. 9, STA2 and STA4 transmit uplink data through the same resource unit resulting in collision, and STA3 and STA5 transmit uplink data through the same resource unit resulting in collision. However, STA1 has successfully transmitted uplink data to the AP. As described above, in the process of transmitting the uplink multi-user data 322, a transmission of only some uplink data may be successful and a transmission of the remaining uplink data may have failed.

For efficient scheduling of the UL-MU transmission, various parameters to be used in a series of transmission processes should be determined. For example, the size of the contention window used in the backoff procedure for transmitting the trigger frame should be determined. Also, as described above, a criterion for determining whether or not the transmission of the uplink multi-user data 322 is successful should be established. In addition, the succeeding operation and the backoff method according to the success or failure determination should be defined.

According to the embodiment of the present invention, the AP may consider that the transmission process is successful even when a part of data is successfully transmitted in the transmission of the uplink multi-user data 322. That is, when uplink data is received from at least one of the STAs indicated by the trigger frame, the AP determines that the UL-MU transmission process is successful. Thus, the AP transmits an M-BA 330 in response to receiving the uplink multi-user data 322. In the embodiment of FIG. 9, STA1 succeeds in uplink data transmission in response to the TF-R 312, and the AP transmits ACK information for the STA1 via the M-BA 330. Meanwhile, FIG. 9 illustrates an embodiment including a random access based UL-MU transmission. However, the present invention is not limited thereto, and the success/failure determination method may be applied to other types of UL-MU transmission processes in the same way.

Since the UL-MU transmission process has been determined to be successful, the AP does not increase the size of the contention window to be used in the backoff procedures in the next contention window intervals 44 and 46. That is, the AP obtains a new backoff counter within a contention window determined based on the access category of the next data to be transmitted, as in the embodiment of FIG. 8. The AP contends with the STAs based on the new backoff counter and accesses the channel.

Figure 10:
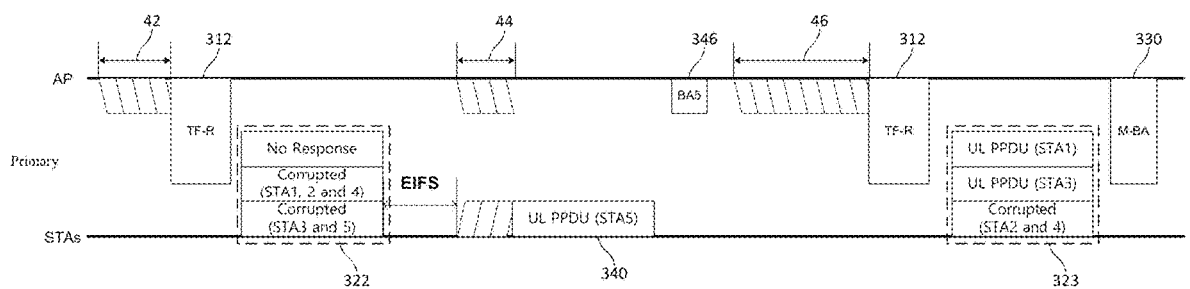
FIGS. 10 to 12 illustrate various embodiments of channel access in a random access based uplink multi-user transmission process.
Figure 11:
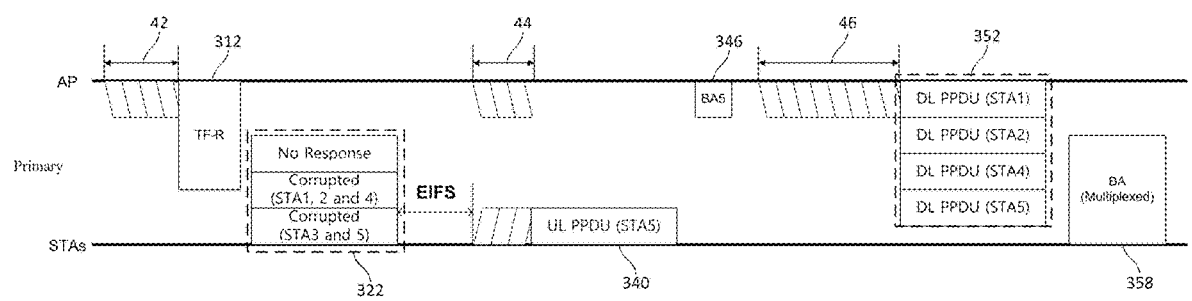
Figure 12:
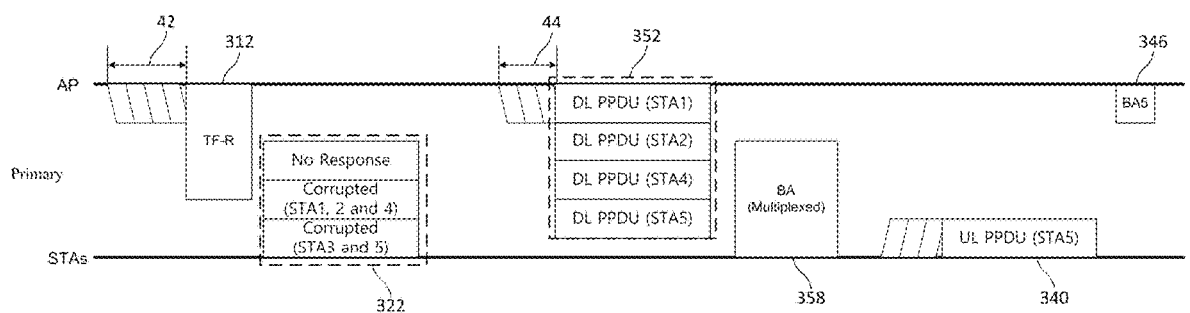

FIGS. 10 to 12 illustrate various embodiments of channel access in a random access based uplink multi-user transmission process. More specifically, the embodiments of FIGS. 10 to 12 illustrate a scheduling method when the AP does not receive any uplink data corresponding to the TF-R. According to the embodiment of the present invention, when the AP does not receive any uplink data corresponding to the trigger frame, it determines that the UL-MU transmission process has failed.

First, according to the embodiment of FIG. 10, the AP may perform retransmission of the TF-R 312 when the UL-MU transmission process by the TF-R 312 has failed. For retransmitting the TF-R 312, the AP obtains a new backoff counter. In this case, the new backoff counter may be determined within a range of twice the contention window used in obtaining the previous backoff counter. That is, when the UL-MU transmission process has failed, the AP doubles the size of the contention window to be used in the backoff procedure of the next contention window intervals 44 and 46. In the contention window intervals 44 and 46, the AP performs a backoff procedure to retransmit the TF-R 312 based on the new backoff counter. The retransmission of the TF-R 312 may be performed until the retransmission is successful within a preset retransmission limit.

In the embodiment of FIG. 10, the UL-MU transmission procedure has failed and the next contention window interval 44 starts after an extended IFS (EIFS) time. The AP and STAs contend in the contention window interval 44, and STA5 wins the contention. Accordingly, the STA5 transmits uplink data 340 to the AP, and the AP transmits an ACK 346 in response thereto. In the next contention window interval 46, the AP wins the contention, and the AP retransmits the TF-R 312. In response to the retransmission of the TF-R 312, the STAs transmit uplink multi-user data 323. In the embodiment of FIG. 10, STA1 and STA3 succeeded in the uplink data transmission in response to the retransmitted TF-R 312. When uplink data is received from at least one STA in response to the TF-R 312, the AP determines that the UL-MU transmission process is successful. Accordingly, the AP transmits ACK information for STA1 and STA3 via the M-BA 330.

FIG. 11 illustrates an embodiment of a channel access according to another embodiment of the present invention. In the embodiment of FIG. 11, duplicated descriptions of parts which are the same or corresponding to those of the embodiment of FIG. 10 will be omitted.

According to the embodiment of FIG. 11, the AP may increase the size of the contention window without performing retransmission of the TF-R 312 when the UL-MU transmission process by the TF-R 312 has failed. When the UL-MU transmission process has failed, the AP may attempt any one of a downlink single-user transmission, a downlink multi-user transmission, and a transmission of a new trigger frame in the next contention window interval. When attempting a downlink single-user transmission or a downlink multi-user transmission, the AP obtains a new backoff counter by doubling the size of the contention window based on the access category of data to be transmitted. When transmitting a new trigger frame, the AP obtains a new backoff counter by doubling the size of the existing contention window based on the access category for the trigger frame. The AP contends with the STAs based on the new backoff counter and accesses the channel.

In the embodiment of FIG. 11, the AP attempts to transmit the downlink multi-user data 352 after the failure of the UL-MU transmission process. That is, a downlink multi-user transmission interrupt (DL-MU interrupt) occurs, and the AP uses the next transmission opportunity for the downlink multi-user transmission. The UL-MU transmission process has failed and the next contention window interval 44 starts after an extended IFS (EIFS) time. The AP and STAs contend in the contention window interval 44, and STA5 wins the contention. Accordingly, the STA5 transmits uplink data 340 to the AP, and the AP transmits an ACK 346 in response thereto. In the next contention window interval 46, the AP wins the contention, and the AP transmits downlink multi-user data 352. The STAs receiving the downlink data 352 from the AP transmit a multiplexed block ACK 358 in response thereto.

As described above, the AP performs a backoff procedure in the next contention intervals 44 and 46 based on a new backoff counter determined in the increased contention window, and transmits downlink multi-user data 352 when the backoff counter of the backoff procedure expires. In the embodiment of FIG. 11, the AP transmits the downlink multi-user data 352 after the failure of the UL-MU transmission process. However, the present invention is not limited thereto, and the AP may transmit downlink single-user data or a new trigger frame.

FIG. 12 illustrates an embodiment of a channel approach according to another embodiment of the present invention. In the embodiment of FIG. 12, duplicated descriptions of parts which are the same or corresponding to those of the embodiment of FIGS. 10 and 11 will be omitted.

According to the embodiment of FIG. 12, when the UL-MU transmission process by the TF-R 312 has failed, the retransmission of the TF-R 312 may not be performed and the size of the contention window may not be increased. Due to the characteristic of random access, collisions may occur even in situations where traffic is not congested. Thus, uniformly increasing the size of a contention window may reduce the transmission efficiency. Therefore, when the random access based UL-MU transmission procedure has failed, the AP may attempt the next transmission without increasing the size of the contention window.

The AP may attempt any one of a downlink single-user transmission, a downlink multi-user transmission, and a transmission of a new trigger frame in the next contention window intervals 44 and 46. When attempting a downlink single-user transmission or a downlink multi-user transmission, the AP obtains a new backoff counter within the contention window based on the access category of data to be transmitted. When transmitting a new trigger frame, the AP obtains a new backoff counter within the contention window based on the access category for the trigger frame. The AP contends with the STAs based on the new backoff counter and accesses the channel. The AP may obtain a new backoff counter without increasing the size of the contention window even though the previous UL-MU transmission process has failed.

In the embodiment of FIG. 12, the AP attempts to transmit downlink multi-user data 352 after the failure of the UL-MU transmission process. The AP and STAs contend in the contention window interval 44, and the AP wins the contention. Thus, the AP transmits downlink multi-user data 352 and the STAs transmit a multiplexed block ACK 358 in response thereto. In the next contention window interval 46, the STA5 wins the contention, and the STA5 transmits uplink data 340. The AP receiving the uplink data 340 from the STA5 transmits an ACK 346 in response thereto.

Figure 13:
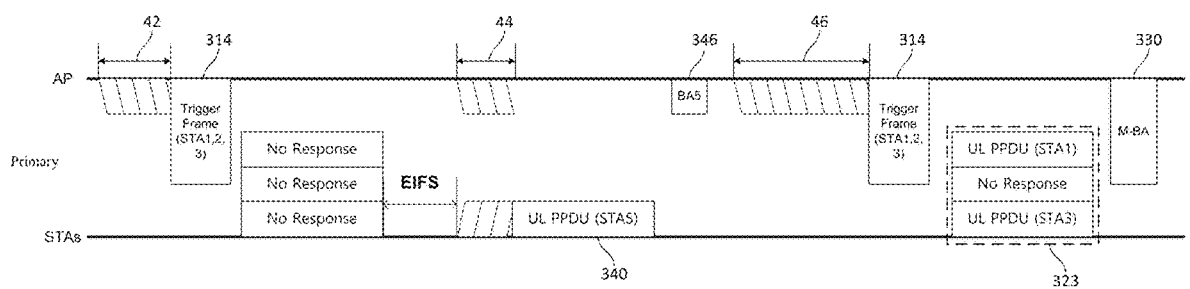
FIGS. 13 to 15 illustrate an embodiment in which the embodiments of FIGS. 10 to 12 are extended to a general uplink multi-user transmission process.
Figure 14:
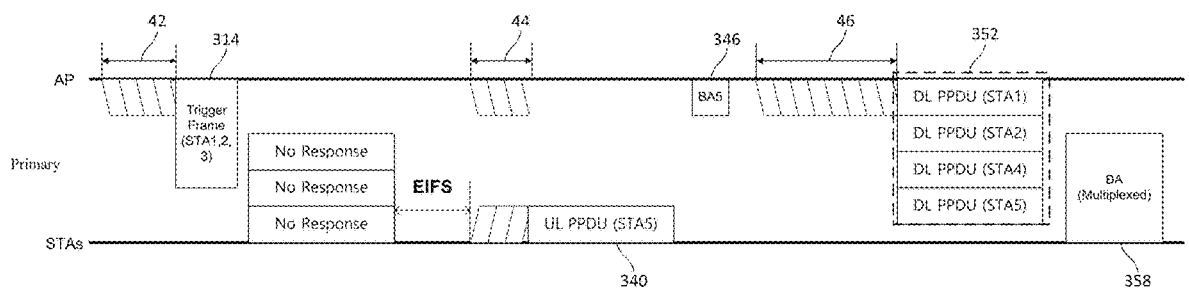
Figure 15:
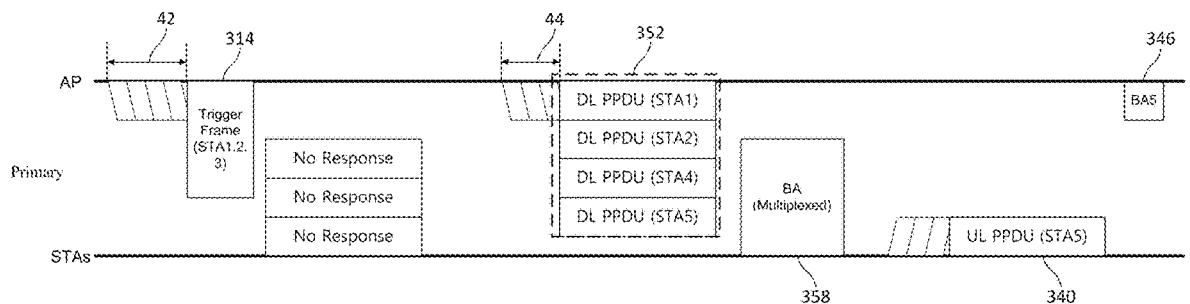

FIGS. 13 to 15 illustrate an embodiment in which the embodiments of FIGS. 10 to 12 are extended to a general uplink multi-user transmission process. The trigger frame 314 indicates identification information of each STA participating in the UL-MU transmission and information of allocated resource units. In the embodiments of FIGS. 10 to 12, the trigger frame 314 solicits uplink multi-user data transmission of STA1, STA2 and STA3. However, the AP does not receive any uplink data in response to the trigger frame 314, and performs scheduling for the failure of the UL-MU transmission process. In the embodiments of FIGS. 13 to 15, duplicated descriptions of parts which are the same or corresponding to those of the embodiments of FIGS. 10 to 12 will be omitted.

First, according to the embodiment of FIG. 13, the AP may perform retransmission of the trigger frame 314 when the UL-MU transmission process has failed. For the retransmission of the trigger frame 314, the AP obtains a new backoff counter. In this case, the new backoff counter can be determined within a range of twice the contention window used in obtaining the previous backoff counter. That is, when the UL-MU transmission process has failed, the AP doubles the size of the contention window to be used in the backoff procedure of the next contention window intervals 44 and 46. In the contention window intervals 44 and 46, the AP performs a backoff procedure to retransmit the trigger frame 314 based on the new backoff counter. The retransmission of the trigger frame 314 may be performed until the retransmission is successful within the preset retransmission limit.

According to an embodiment of the present invention, the AP may select an access category for transmitting the trigger frame 314. The size of the contention window for transmitting the trigger frame 314 is determined based on the selected access category. According to an embodiment of the present invention, a minimum contention window value, a maximum contention window value, an AIFS time, a maximum transmission opportunity (TXOP), and the like may be defined for each access category. Accordingly, the size of the contention window for transmitting the trigger frame 314 is determined between the minimum contention window value and the maximum contention window value set in the corresponding access category. According to an embodiment, an access category separately set for the trigger frame 314 may be used. According to another embodiment of the present invention, any one of the categories set for the enhanced distributed channel access (EDCA) may be selected as an access category for transmitting the trigger frame 314.

In the embodiment of FIG. 13, the AP determines the size of the contention window based on the access category corresponding to the trigger frame 314 and assigns a backoff counter within the determined contention window. When the UL-MU transmission process has failed and the AP retransmits the trigger frame 314, the AP increases the size of the contention window of the access category for the trigger frame 314. According to an embodiment, the size of the increased contention window is determined within a range of twice the size of the previous contention window. A new backoff counter for retransmitting the trigger frame 314 is obtained within the increased contention window.

The AP and the STAs contend in the next contention window intervals 44 and 46, and the terminal whose backoff counter has expired performs transmission. In this case, the AP participates in the contention using the new backoff counter. The AP that has won the contention in the contention window interval 46 retransmits the trigger frame 314. In response to the retransmitted trigger frame 314, STA1 and ST3 transmit uplink multi-user data 323. Since uplink data has been received from at least one of the STAs indicated by the trigger frame 314, the AP determines that the UL-MU transmission procedure is successful. Accordingly, the AP transmits ACK information for STA1 and STA3 via the M-BA 330.

Next, according to the embodiment of FIG. 14, the AP may increase the size of the contention window without performing the retransmission of the trigger frame 314 when the UL-MU transmission process has failed. When the UL-MU transmission process has failed, the AP may attempt any one of a downlink single-user transmission, a downlink multi-user transmission, and a transmission of a new trigger frame in the next contention window interval. In this case, the AP may increase the contention window based on the access category of the packet to be transmitted. That is, when attempting a downlink single-user transmission or a downlink multi-user transmission, the AP obtains a new backoff counter by doubling the size of the contention window based on the access category of data to be transmitted. When transmitting a new trigger frame, the AP obtains a new backoff counter by doubling the size of the existing contention window based on the access category for the trigger frame. The AP uses the new backoff counter determined based on the increased contention window to contend with the STAs and access the channel.

In the embodiment of FIG. 14, the AP attempts to transmit the downlink multi-user data 352 after the failure of the UL-MU transmission process. According to an embodiment of the present invention, a separate access category for downlink multi-user transmission may be defined. In this case, the AP may obtain a new backoff counter by increasing the size of the contention window of the separate access category. According to another embodiment of the present invention, the downlink multi-user transmission may be performed based on a primary access category. In this case, the AP may obtain a new backoff counter by increasing the size of the contention window of the primary access category.

Next, according to the embodiment of FIG. 15, the AP may not retransmit the trigger frame 314 and may not increase the size of the contention window when the UL-MU transmission process fails. That is, when the UL-MU transmission process has failed, the AP may attempt the next transmission without increasing the size of the contention window.

The AP may attempt any one of a downlink single-user transmission, a downlink multi-user transmission, or a transmission of a new trigger frame in the next contention window intervals 44 and 46. In this case, the AP may determine the contention window based on the access category of the packet to be transmitted. That is, when attempting a downlink single-user transmission or a downlink multi-user transmission, the AP obtains a new backoff counter within a contention window based on the access category of data to be transmitted. When transmitting a new trigger frame, the AP obtains a new backoff counter within the existing contention window based on the access category for the trigger frame. The AP contends with the STAs based on the new backoff counter and accesses the channel.

Figure 16:
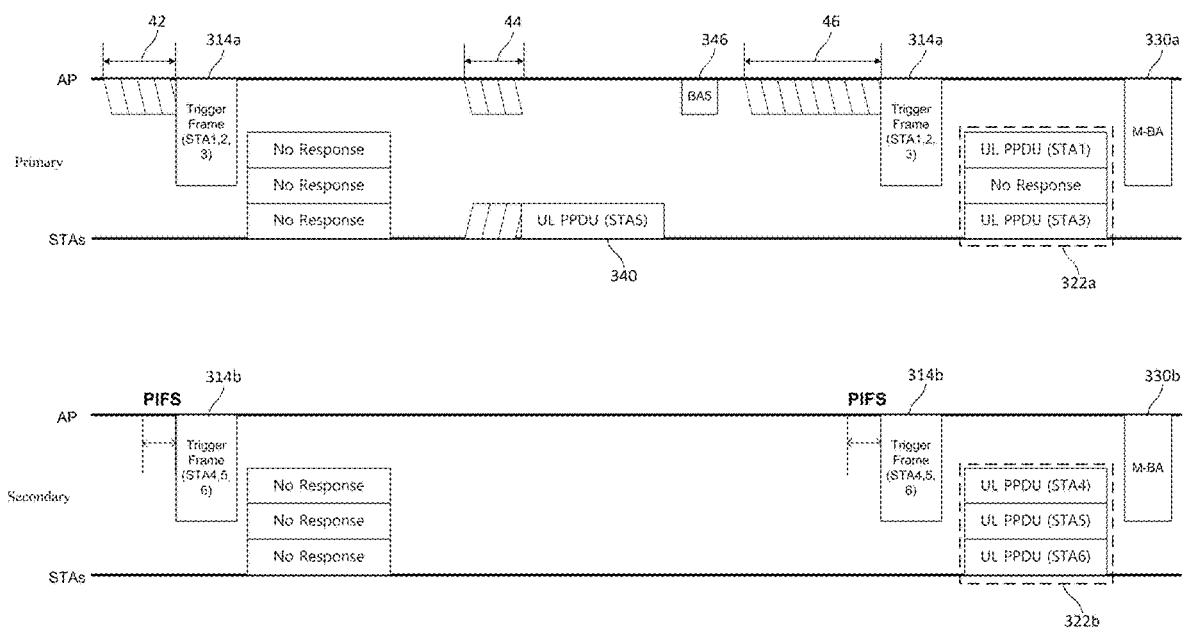
FIGS. 16 and 17 illustrate embodiments of channel access in an uplink multi-user transmission process using a wideband channel.
Figure 17:
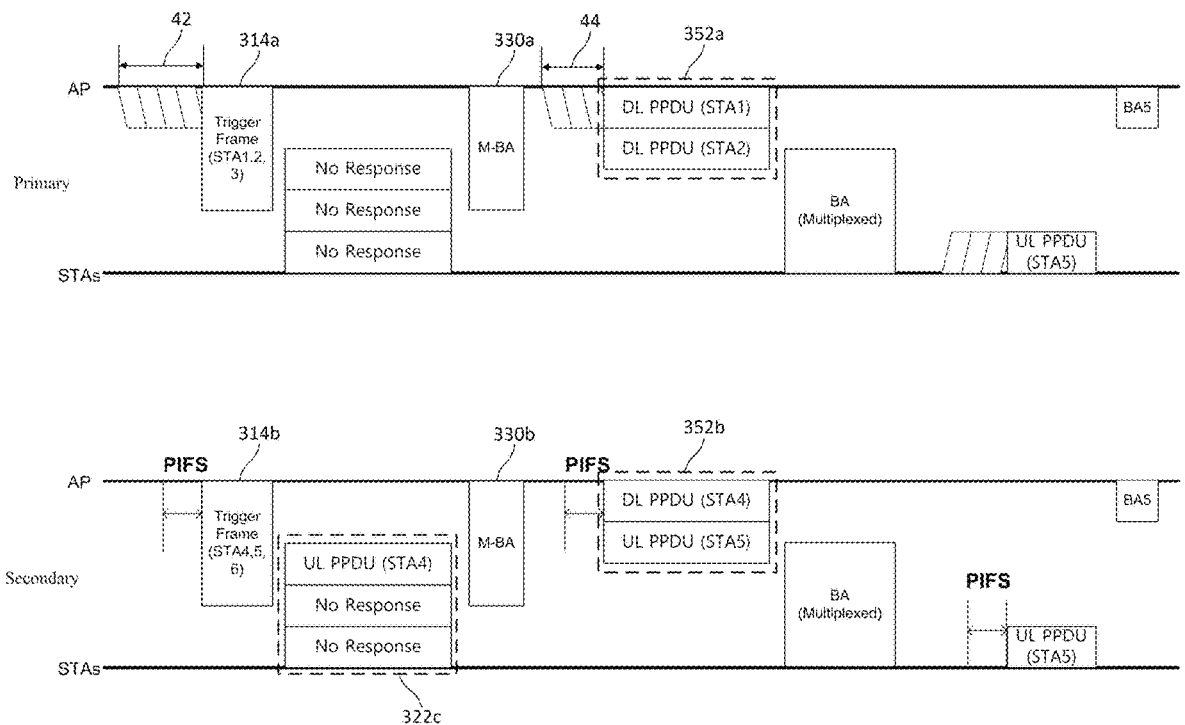

FIGS. 16 and 17 illustrate embodiments of channel access in an uplink multi-user transmission process using a wideband channel According to an embodiment of the present invention, the UL-MU transmission process may be performed through a wideband channel of 20 MHz or more. In the embodiments of FIGS. 16 and 17, the duplicated descriptions of parts which are the same or corresponding to those of the embodiments of FIGS. 10 to 15 will be omitted.

In the embodiment of FIGS. 16 and 17, the AP transmits trigger frames 314a and 314b on the primary channel and the secondary channel to initiate the UL-MU transmission process. The AP may perform a backoff procedure on the primary channel for transmitting the trigger frames 314a, 314b. When the backoff procedure for transmitting the trigger frame 314a expires in the contention window interval 42, the AP transmits the trigger frame 314a on the primary channel. The AP performs a CCA for the secondary channel during a PIFS time before the expiration of the backoff procedure. When the secondary channel is in the idle state as a result of the CCA, the AP transmits the trigger frame 314*a* of the primary channel and the trigger frame 314*b* of the secondary channel together. In the embodiment of FIGS. 16 and 17, the trigger frame 314*a* of the primary channel solicits uplink multi-user data transmission of STA1, STA2 and STA3, and the trigger frame 314*b* of the secondary channel solicits uplink multi-user transmission of STA4, STA5 and STA6.

Referring to FIG. 16, the AP does not receive any uplink data in response to the trigger frames 314*a* and 314*b* transmitted through the primary channel and the secondary channel, and performs scheduling for the failure of the UL-MU transmission process. According to the embodiment of FIG. 16, the AP may perform retransmission of the trigger frames 314*a* and 314*b*. For retransmitting the trigger frames 314*a* and 314*b*, the AP obtains a new backoff counter. A specific embodiment for obtaining the new backoff counter for retransmitting the trigger frames 314*a* and 314*b* is as described above in the embodiment of FIG. 13.

The AP and the STAs contend in the next contention window intervals 44 and 46, and the terminal whose backoff counter has expired performs transmission. In this case, the AP participates in the contention using the aforementioned new backoff counter. The AP that has won the contention in the contention window interval 46 retransmits the trigger frames 314*a* and 314*b*. In response to the retransmitted trigger frames 314*a* and 314*b*, STA1 and ST3 transmit uplink multi-user data 322*a* on the primary channel, and STA4, STA5 and STA6 transmit uplink multi-user data 322*b* on the secondary channel. Since uplink data has been received from at least one of the STAs indicated by the trigger frames 314*a* and 314*b*, the AP determines that the UL-MU transmission process is successful. Accordingly, the AP transmits the M-BA 330*a* and 330*b* including ACK information for the five STAs that have successfully transmitted the uplink data.

Next, referring to FIG. 17, the AP receives uplink data 322*c* of STA4 in response to the trigger frames 314*a* and 314*b* transmitted on the primary channel and the secondary channel. Since uplink data 322*c* has been received from at least one of the STAs indicated by the trigger frames 314*a* and 314*b*, the AP determines that the UL-MU transmission process is successful. The AP transmits the M-BA 330*a* and 330*b* including ACK information for the STA4 that has successfully transmitted the uplink data.

Since the UL-MU transmission process has been determined to be successful, the AP does not increase the size of the contention window to be used in the backoff procedure in the next contention window interval 44. That is, the AP obtains a new backoff counter within the contention window determined based on the access category of the next data 352*a* and 352*b* to be transmitted. The AP contends with the STAs based on the new backoff counter and accesses the channel.

<An EDCA Method of a Multi-User Transmission>

Figure 18:
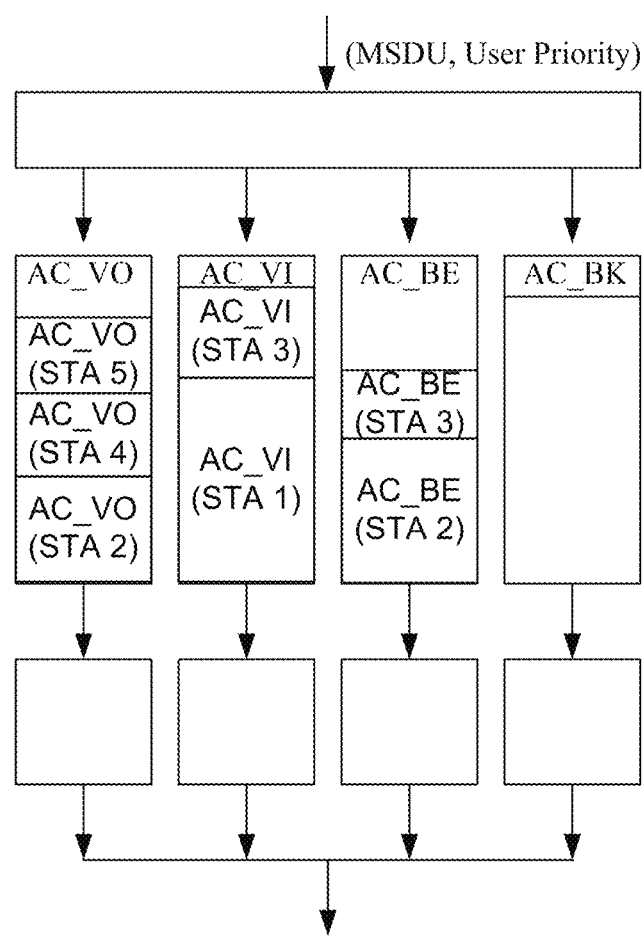
FIG. 18 illustrates an embodiment of an enhanced distributed channel access (EDCA).

FIG. 18 illustrates an embodiment of an enhanced distributed channel access (EDCA). Referring to FIG. 18, data to be transmitted by a terminal is logically arranged in each access category queue according to a predetermined priority. The access category includes a voice access category (i.e., AC_VO), a video access category (i.e., AC_VI), a best effort access category (i.e., AC_BE) and a background access category (i.e., AC_BK). The terminal contends for channel access based on the parameters set for each access category. In this case, the parameters include a minimum contention window value, a maximum contention window value, an AIFS time, and a maximum TXOP.

Each access category performs internal contention based on the parameters of the access category when the corresponding queue is not empty. That is, a backoff counter is assigned to a corresponding access category based on the parameters of each access category, and internal contention between the access categories is performed based on the assigned backoff counters. The access category whose backoff counter expires first and has won the internal contention is set to the primary access category and data in the queue of the corresponding access category is determined as transmission data. According to an embodiment, in a multi-user transmission, data in a secondary access category may be transmitted with data in the primary access category using TXOP sharing.

In the embodiment of FIG. 18, data to be transmitted to STA2, STA4 and SAT5 are stacked in the queue of AC_VO, and data to be transmitted to STA1 and STA3 are stacked in the queue of AC_VI. In addition, data to be transmitted to STA2 and STA3 are stacked in the queue of AC_BE. Therefore, AC_VO, AC_VI and AC_BE perform internal contention using the respective parameters. Hereinafter, in the embodiments of FIGS. 19 to 24, it is assumed that AC_VI is set as a primary access category and AC_VO and AC_BE are set as a secondary access category as a result of the internal contention.

Figure 19:
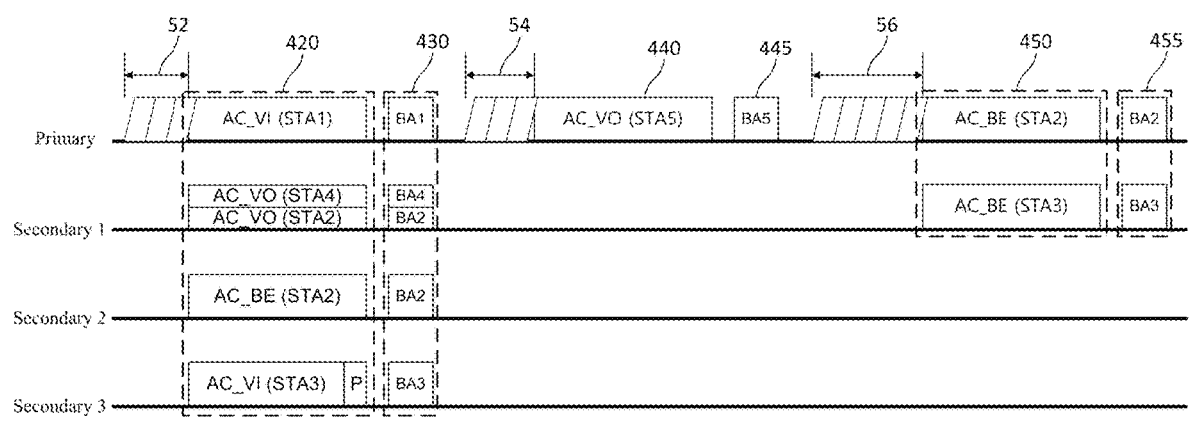
FIG. 19 illustrates an embodiment of a downlink multi-user transmission process.

FIG. 19 illustrates an embodiment of a downlink multi-user transmission process. In the embodiment of FIG. 19, the AP is a multi-user transmitting terminal, and the STA, STA2, STA3 and STA4 are multi-user receiving terminals.

The AP may perform a downlink multi-user data transmission when a downlink multi-user (DL-MU) interrupts occur. In the embodiment of the present invention, the DL-MU interrupt indicates an operation in which a predetermined condition for DL-MU data transmission is satisfied, and a multi-user transmitting terminal determines transmission of DL-MU data. The predetermined condition for the DL-MU interrupt to occur includes a case that data to be transmitted to a plurality of STAs is stacked a predetermined size or more in an access category queue, a case that a predetermined time or more has elapsed after data to be transmitted to a plurality of STAs is stacked in an access category queue, and the like. According to an embodiment of the present invention, the AP may generate a separate virtual queue for the DL-MU transmission. In this case, DL-MU interrupts may occur when data of a predetermined size or more is stacked in the virtual queue.

When a DL-MU interrupt occurs, the AP performs a backoff procedure in the contention window interval 52 for transmitting the downlink multi-user data 420. For the backoff procedure to transmit downlink multi-user data 420, the AP assigns a backoff counter. According to an embodiment, the AP may determine a contention window based on an access category separately set for DL-MU transmission and assign a backoff counter within the contention window. According to another embodiment, the AP may determine a contention window based on the primary access category of the downlink multi-user data 420 to be transmitted and may assign a backoff counter within the contention window. The AP performs the backoff procedure in the contention window interval 52 using the assigned backoff counter after an AIFS time of the set access category.

When the backoff counter of the backoff procedure for transmitting the downlink multi-user data 420 expires in the contention window interval 52, the AP transmits downlink multi-user data 420. The downlink multi-user data 420 may be transmitted in a form including at least one of OFDMA and MU-MIMO. The STAs receive downlink multi-user data 420 transmitted by the AP and transmit ACK 430 in response thereto. In the embodiment of FIG. 19, the AP transmits downlink multi-user data 420 to STA1, STA2, STA3 and STA4, and each STA transmits ACK 430 in response to the reception of the downlink multi-user data 420. The ACK 430 transmitted by a plurality of STAs may be transmitted by being multiplexed in a time domain or a frequency domain.

After the DL-MU transmission process is completed, the AP may perform additional data transmission in the next contention window intervals 54 and 56. If a new DL-MU interrupt does not occur, the AP performs a transmission of downlink single-user data 440. In this case, downlink data 440 of an access category that has obtained the transmission opportunity through internal contention between access category queues of the AP may be transmitted. In the embodiment of FIG. 19, AC_VO has won the internal contention of the AP. The AP transmits the downlink data 440 of AC_VO to the STA5 after a backoff procedure in the contention window interval 54. The STA5 receives the downlink data 440 and transmits an ACK 445 in response thereto.

Thereafter, when the DL-MU interrupt occurs again, the AP performs a backoff procedure for transmitting the downlink multi-user data 450 in the contention window interval 56. When the backoff counter of the backoff procedure expires, the AP transmits downlink multi-user data 450. The AP transmits downlink multi-user data 450 to STA2 and STA3, and each STA transmits ACK 455 in response to the reception of the downlink multi-user data 450.

Figure 20:
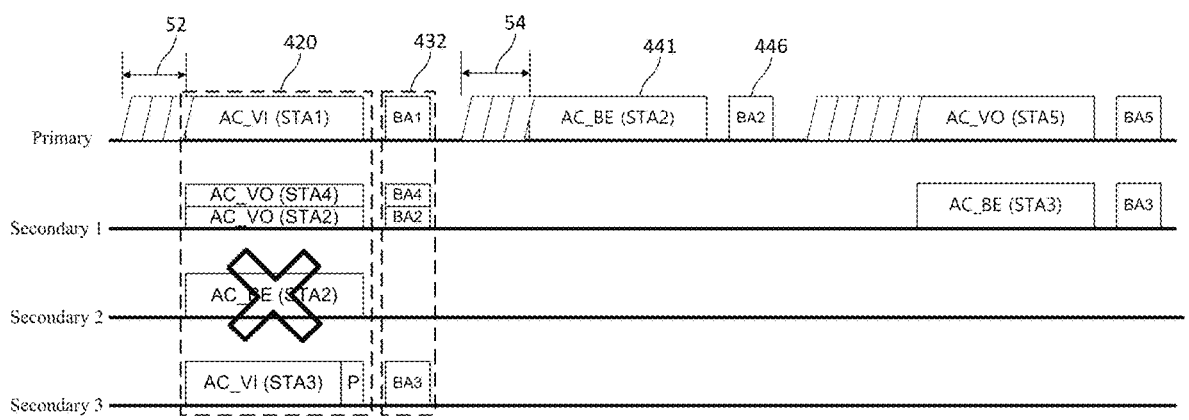
FIGS. 20 to 22 illustrate a channel access method when a transmission of some data has failed in the downlink multi-user transmission process.
Figure 21:
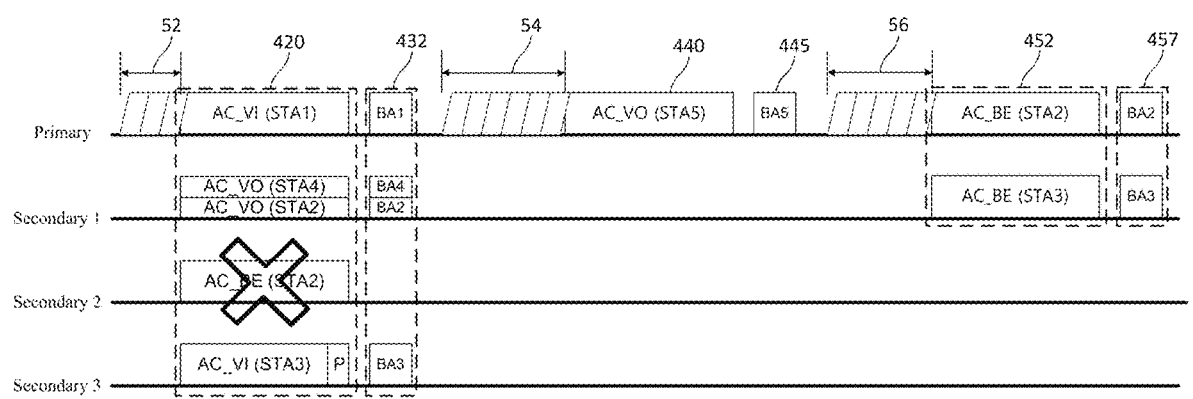
Figure 22:
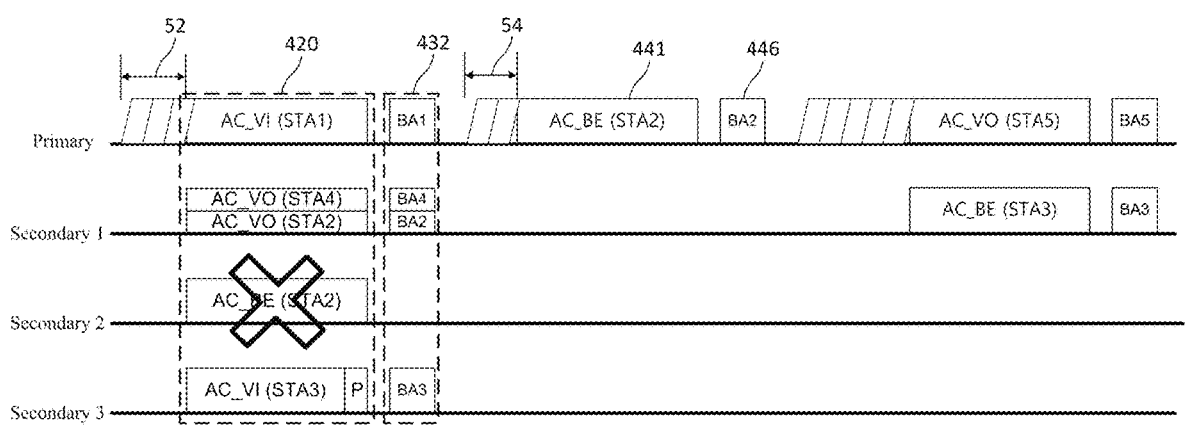

FIGS. 20 to 22 illustrate a channel access method when a transmission of some data has failed in the downlink multi-user transmission process. In the embodiment of FIGS. 20 to 22, the AP transmits downlink multi-user data 420 to STA1 through STA4. However, some downlink data, i.e., downlink data of AC_BE to STA2, has failed to be transmitted. STA1 to STA4 transmit an ACK 432 in response to the successfully received downlink data. In each of the embodiments of FIGS. 20 to 22, duplicated descriptions of parts which are the same or corresponding to those of the previous embodiments will be omitted.

First, referring to FIG. 20, the AP considers that the transmission process is successful even when a part of data is successfully transmitted in the transmission of downlink multi-user data 420. That is, when the ACK 432 is received from at least one STA among the STAs to which the downlink multi-user data 420 is transmitted, the AP determines that the DL-MU transmission process is successful. On the other hand, the AP may attempt to retransmit some downlink data that has failed to be transmitted. According to an embodiment, the AP may retransmit downlink data that has failed to be transmitted through internal contention. The downlink data that has failed to be transmitted contend for transmission in the access category queue of the corresponding data. In the embodiment of FIG. 20, the downlink data 441 of the AC_BE that has failed to be transmitted in the first DL-MU transmission process is retransmitted through the internal contention of the AP in the next contention window interval 54. STA2 receives downlink data 441 and transmits ACK 446 in response thereto.

Next, according to the embodiment of FIG. 21, when a transmission of some data has failed in the transmission of the downlink multi-user data 420, the AP increases the size of the contention window of the access category of the corresponding data. According to an embodiment, the size of the contention window of the access category may be increased to twice the size of the previous contention window. By thus increasing the size of the contention window of the access category, a penalty may be added to the contention when retransmitting the downlink data that has failed to be transmitted. This penalty for the transmission contention may be only applied to the internal contention of the AP. That is, the AP does not increase the sizes of the contention windows of the access categories other than the access category of the downlink data to be retransmitted.

Referring to the embodiment of FIG. 21, in the first DL-MU transmission process, transmission of downlink data of AC_BE has failed. Thus, the AP increases the size of the contention window of AC_BE. AC_BE obtains a new backoff counter within the increased contention window and participates in the internal contention using the new backoff counter. In the next contention window interval 54, AC_VO has won the internal contention of the AP. The AP transmits the downlink data 440 of AC_VO to the STA5 after a backoff procedure in the contention window interval 54. The STA5 receives the downlink data 440 and transmits an ACK 445 in response thereto.

After the transmission of downlink data 440, a DL-MU interrupt occurs and the AP performs a backoff procedure for transmitting downlink multi-user data 452 in the contention window interval 56. When the backoff counter of the backoff procedure expires, the AP transmits the downlink multi-user data 452. The data of AC_BE that has received a new backoff counter and has contended for transmission is transmitted as downlink multi-user data 452. The STAs receiving the downlink multi-user data 452 from the AP transmit an ACK 457 in response thereto.

Next, according to the embodiment of FIG. 22, when a transmission of some data has failed in the transmission of downlink multi-user data 420, the AP decreases the size of the contention window of the access category of the corresponding data. According to an embodiment, the size of the contention window of the access category may be set to the minimum contention window value of the corresponding access category. According to another embodiment, the size of the contention window of the access category may be reduced to a certain percentage value of the size of the previous contention window. By thus decreasing the size of the contention window of the access category, a priority may be added to the contention when retransmitting the downlink data that has failed to be transmitted.

Referring to the embodiment of FIG. 22, the AP decreases the size of the contention window of AC_BE in which the transmission has failed in the first DL-MU transmission process. AC_BE obtains a new backoff counter within the reduced contention window and participates in the internal contention using the new backoff counter. As a result, AC_BE has won the internal contention of the AP in the next contention window interval 54. The AP retransmits the downlink data 441 of AC_BE to the STA2 after a backoff procedure in the contention window interval 54. The STA2 receives the downlink data 441 and transmits an ACK 446 in response thereto.

On the other hand, according to an additional embodiment of the present invention, the size of the contention window of the access category that has failed in transmission can be variously adjusted. For example, the increase or decrease ratio of the size of the contention window may be adjusted according to the number of users or the size of channel that has failed in transmission in the previous DL-MU transmission process.

Figure 23:
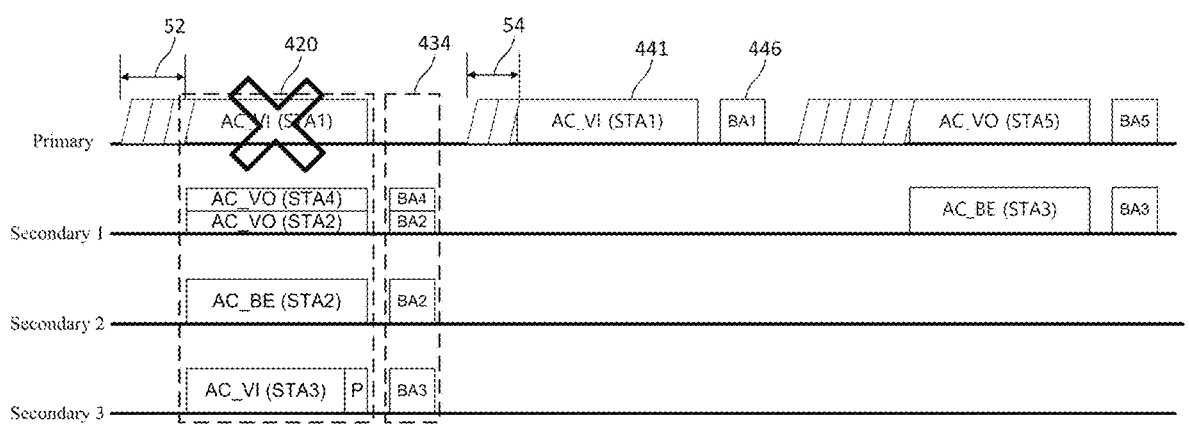
FIGS. 23 and 24 illustrate a channel access method when a data transmission of primary access category has failed in the downlink multi-user transmission process.
Figure 24:
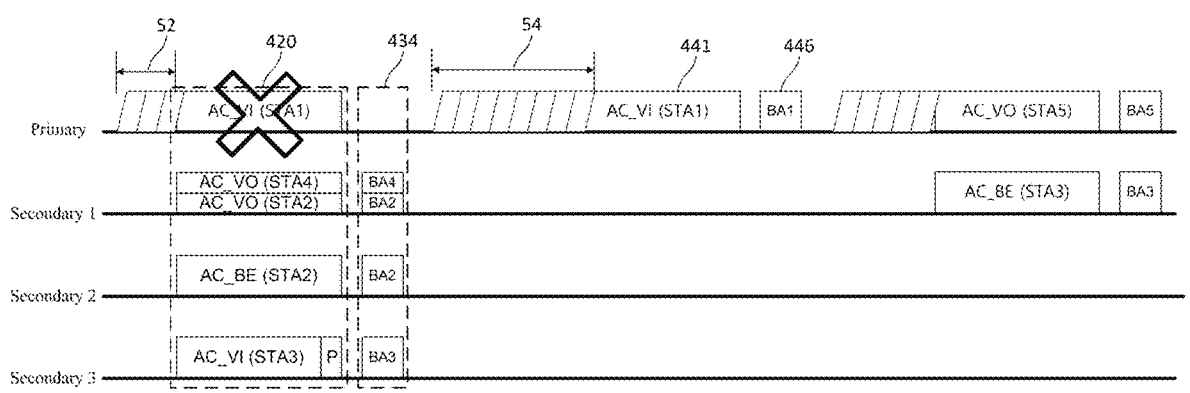

FIGS. 23 and 24 illustrate a channel access method when a data transmission of a primary access category has failed in the downlink multi-user transmission process. In the embodiment of FIGS. 23 and 24, the AP transmits downlink multi-user data 420 to STA1 through STA4. However, some downlink data, i.e., downlink data of AC_VI to STA1, has failed to be transmitted. In this case, the AC_VI is the primary access category of the downlink multi-user data 420. STA2 to STA4 transmit an ACK 434 in response to the successfully received downlink data. In each of the embodiments of FIGS. 23 and 24, duplicated descriptions of parts which are the same or corresponding to those of the previous embodiments will be omitted.

According to an embodiment of the present invention, the EDCA of the downlink multi-user data 420 may be performed based on the primary access category of the corresponding data. That is, the AP determines a contention window based on the primary access category of the downlink multi-user data 420 and assigns a backoff counter within the contention window. The AP performs a backoff procedure in the contention window interval 52 using the assigned backoff counter after an AIFS time of the set access category.

In addition, success of the transmission of the downlink multi-user data 420 may be determined based on whether or not the primary access category data is successfully transmitted. That is, when the transmission of the primary access category data among the downlink multi-user data 420 is successful, the AP determines that the DL-MU transmission process is successful. However, when the transmission of the primary access category data among the downlink multi-user data 420 has failed, the AP determines that the DL-MU transmission process has failed. The AP performs retransmission of the primary access category data that has failed to be transmitted. When a DL-MU interrupt occurs during the retransmission, the AP may transmit the primary access category data along with other data remaining in the queue via DL-MU.

Referring to FIG. 23, the AP determines a contention window of a primary access category AC_VI whose transmission has failed based on the parameters of the corresponding access category and attempts a retransmission by assigning a new backoff counter. In the next contention window interval 54, the primary access category AC_VI wins the contention, and the AP retransmits the downlink data 441 of the primary access category AC_VI to the STA1. The STA1 receives the downlink data 441 and transmits an ACK 446 in response thereto.

On the other hand, referring to FIG. 24, the AP may increase the size of the contention window due to the failure of the DL-MU transmission process. According to an embodiment, the AP may increase the size of the contention window of the primary access category AC_VI whose transmission has failed. According to another embodiment, the AP may increase the sizes of the contention windows of the entire access categories. The AP obtains a new backoff counter within the increased contention window and performs retransmission of the downlink data 441 of the primary access category AC_VI using the new backoff counter.

Meanwhile, according to another exemplary embodiment of the present invention, a contention window may be determined based on an access category separately set for a DL-MU transmission, and a transmission of downlink multi-user data 420 may be performed by assigning a backoff counter within the corresponding contention window. However, success of the transmission of the downlink multi-user data 420 may be determined based on whether or not the primary access category data has been successfully transmitted. In this case, the AP may perform retransmission of the downlink data 441 of the primary access category based on the parameters of the access category separately set for the DL-MU transmission.

Figure 25:
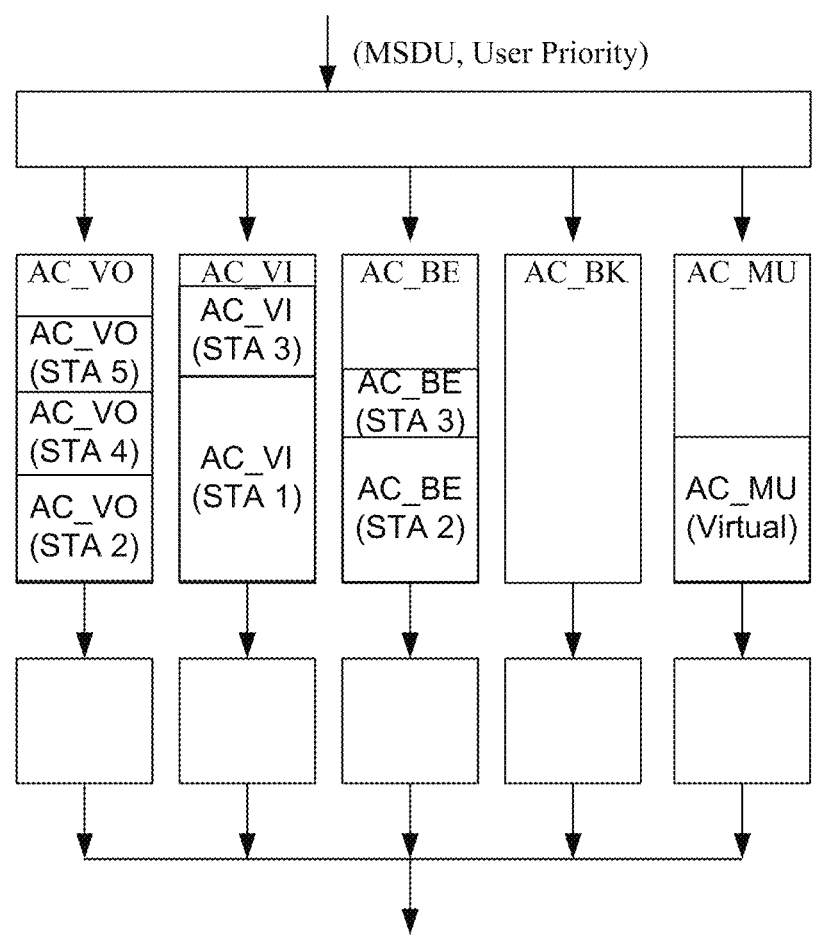
FIGS. 25 and 26 illustrate an embodiment of an EDCA including multi-user transmission.
Figure 26:
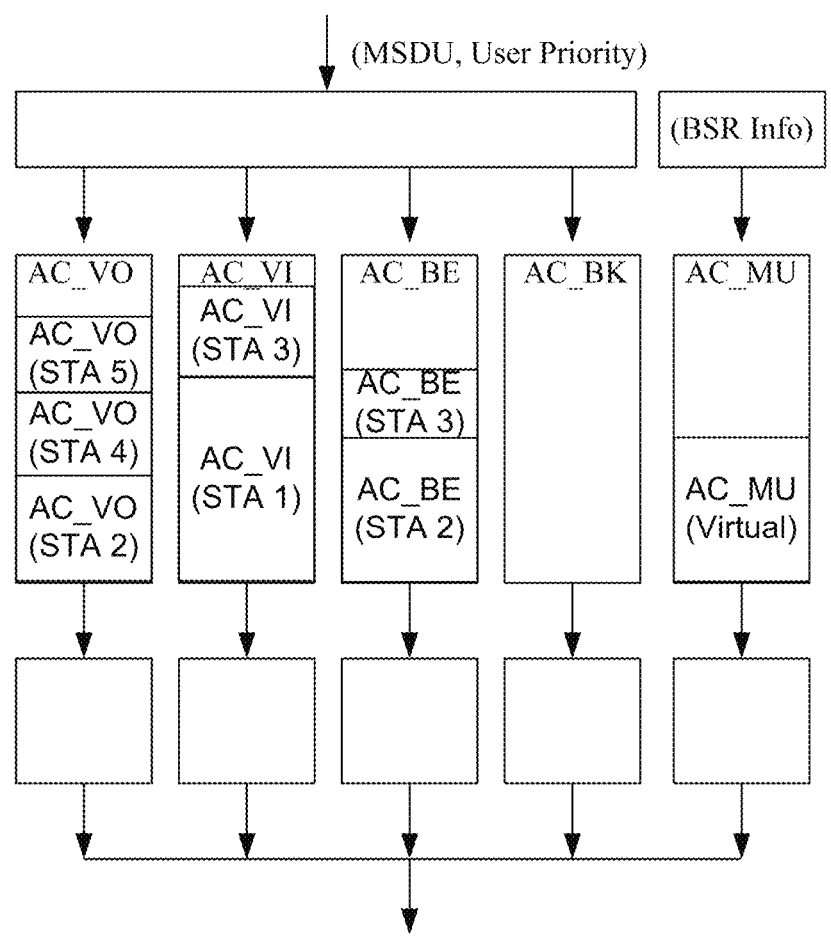

FIGS. 25 and 26 illustrate an embodiment of an EDCA including a multi-user transmission. According to an embodiment of the present invention, the access category queue for EDCA may further comprise an access category queue for multi-user transmission. In this case, the access category queue for the multi-user transmission includes at least one of a queue for a multi-user downlink transmission and a queue for transmitting a trigger frame. According to an embodiment, the queue for the multi-user transmission may be operated as a virtual queue.

Referring to FIG. 25, the AP inserts a virtual frame into an access category AC_MU queue for the multi-user transmission. The AP determines the size of the contention window of the access category based on the parameters of AC_MU. According to an embodiment, the AC_MU may have a higher priority than the access categories of data to be transmitted to another STA. For example, the AC_MU may be set to have a higher priority than other access categories where the queue is not empty. The parameters of AC_MU are determined based on the set priority. According to another embodiment of the present invention, the parameters of AC_MU may use parameters of a particular access category selected from other access categories. For example, the parameters of AC_MU may be set equal to parameters of the highest priority access category among the other access categories where the queue is not empty. The AC_MU may use one of the access categories used in the legacy WLAN system equally. According to an embodiment, the parameters of the AC_MU may be set equal to the parameters of AC_VO or AC_VI to assign a priority to the UL-MU transmission. As described above, the parameters of the access category include at least one of a minimum contention window value, a maximum contention window value, an AIFS time, and a maximum TXOP.

According to still another embodiment of the present invention, the AP may adjust the parameters of AC_MU to adjust the priority of a frame of the corresponding queue in the internal contention. When the multi-user transmission is performed with the highest priority such as the DL_MU interrupt, the AP may set the contention window value of the AC_MU to zero. However, when multi-user transmission is not performed, the AP may set the minimum contention window value or the contention window value of the AC_MU to the maximum value of the system. The AP may adjust the parameters of AC_MU based on the system status or the state of the AC_MU queue.

Referring to FIG. 26, the AP receives the buffer status report (BSR) of STAs and generates an AC_MU queue using the received buffer status report. According to an embodiment of the present invention, the AC_MU includes an access category for transmitting a trigger frame. The AP may perform a backoff procedure for transmitting the trigger frame when the received buffer status report information is a predetermined amount or more. In this case, the AP determines the size of the contention window based on the parameters of the AC_MU and obtains a backoff counter for transmitting the trigger frame within the determined contention window.

According to the embodiment of FIG. 26, the AP determines whether to transmit a trigger frame based on an internal contention between access category queues for a downlink single-user transmission and an AC_MU queue. More specifically, the access category queues for the downlink single-user transmission includes an AC_VO queue, an AC_VI queue, an AC_BE queue, and an AC_BK queue used in a legacy WLAN system. The AP assigns backoff counters corresponding to the access category queues and the AC_MU queue, respectively. In this case, the backoff counters are assigned based on the parameters of the access category set in the corresponding queue, respectively. The AP may transmit a trigger frame when the backoff counter corresponding to the AC_MU queue expires. As described above, according to the embodiment of the present invention, the AC_MU may have a higher priority than the access categories of data to be transmitted to another STA. Thus, the trigger frame may be transmitted with a higher priority than the frame of the other access categories.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal comprising:
a transceiver configured to transmit and receive a wireless signal; and
a processor configured to control an operation of the terminal,
wherein the processor is configured to:
perform a backoff procedure in a contention window according to an access category determined for transmission of a trigger frame which solicits an uplink multi-user transmission,
transmit the trigger frame to at least one terminal, when a backoff counter is expired in the backoff procedure,
adjust a size of the contention window according to whether a transmission of the trigger frame is successful,
wherein whether or not uplink multi-user transmission is successful is determined according to whether one or more uplink frames is received in response to the trigger frame from the at least one terminal, and
wherein the size of the contention window is not increased, when the uplink multi-user transmission is successful, and is increased, when the uplink multi-user transmission is failed.

2. The base wireless communication terminal of claim 1, wherein the uplink multi-user transmission is determined to success, when the one or more uplink frames are receive from the at least one terminal in response to the trigger frame.

3. The base wireless communication terminal of claim 1, wherein the uplink multi-user transmission is determined to failure, when the one or more uplink frames are not received from the at least one terminal in response to the trigger frame.

4. The base wireless communication terminal of claim 3, wherein the size of the contention window of the access category determined for transmission of the trigger frame is increased, when the uplink multi-user transmission is determined to have failed.

5. The base wireless communication terminal of claim 4, wherein the size of the contention window is increased between a minimum contention window value and a maximum contention window value of the determined access category.

6. The base wireless communication terminal of claim 1, wherein a block ACK is transmitted in response to the plurality of uplink data, when a plurality of uplink frames are received, in response to the trigger frame, from the at least one terminal.

7. The base wireless communication terminal of claim 1, wherein the access category for transmission of the trigger frame is a primary access category of the downlink data.

8. The base wireless communication terminal of claim 1, wherein the access category selected for transmitting the trigger frame has a highest priority among access categories of data to be transmitted to another terminal.

9. The base wireless communication terminal of claim 1, wherein the processor is further configured to:
Receive a buffer status report of at least one terminal through the transceiver, and perform a backoff procedure for transmitting the trigger frame when received buffer status report information is a predetermined amount or more.

10. The base wireless communication terminal of claim 9, wherein the processor is further configured to:
   generate a virtual queue for transmitting the trigger frame using the received buffer status report, and
   determine whether to transmit the trigger frame based on internal contention between an access category queue for a downlink single-user transmission of the base wireless communication terminal and the virtual queue.

11. A wireless communication method of a base wireless communication terminal, the method comprising:
   performing a backoff procedure in a contention window according to a access category determined for transmission of a trigger frame which solicits an uplink multi-user transmission;
   transmitting the trigger frame to at least one terminal, when a backoff counter is expired in the backoff procedure,
   adjusting a size of the contention window according to whether a transmission of the trigger frame is successful,
   wherein whether or not uplink multi-user transmission is successful is determined according to whether one or more uplink frames is received in response to the trigger frame from the at least one terminal, and
   wherein the size of the contention window is not increased, when the transmission of the trigger frame is successful, and is increased, when the transmission of the trigger frame fails.

12. The base wireless communication method of claim 11, wherein the uplink multi-user transmission is determined to success, when the one or more uplink frames are received from the at least one terminal in response to the trigger frame.

13. The base wireless communication method of claim 11, wherein the uplink multi-user transmission is determined to failure, when the one or more uplink frames are not received from the at least one terminal in response to the trigger frame.

14. The base wireless communication method of claim 12, wherein the size of the contention window of the access category determined for transmission of the trigger frame is increased, when the uplink multi-user transmission is determined to have failed.

15. The base wireless communication method of claim 14, wherein the size of the contention window is increased between a minimum contention window value and a maximum contention window value of the determined access category.

16. The base wireless communication method of claim 11, wherein a block ACK is transmitted in response to the plurality of uplink data, when a plurality of uplink frames are received, in response to the trigger frame, from the at least one terminal.

17. The base wireless communication method of claim 11, wherein the access window for transmission of the trigger frame is a primary access category of the downlink data.

18. The base wireless communication method of claim 11, wherein the access category selected for transmitting the trigger frame has a highest priority among access categories of data to be transmitted to another terminal.

19. The base wireless communication method of claim 11, wherein the communication method is further comprised:
   receiving a buffer status report of at least one terminal; and
   performing a backoff procedure for transmitting the trigger frame when received buffer status report information is a predetermined amount or more.

20. The base wireless communication method of claim 19, wherein the communication method is further comprised:
   generating a virtual queue for transmitting the trigger frame using the received buffer status report; and
   determining whether to transmit the trigger frame based on internal contention between an access category queue for downlink single-user transmission of the base wireless communication terminal and the virtual queue.

* * * * *